(12) United States Patent
Hayashida et al.

(10) Patent No.: US 8,811,003 B1
(45) Date of Patent: Aug. 19, 2014

(54) KEYBOARD SUPPORT MEMBER FOR A COMPUTING DEVICE

(71) Applicant: Google, Inc., Mountain View, CA (US)

(72) Inventors: Jeffrey Hayashida, San Francisco, CA (US); Michelle Yu, Oakland, CA (US); Ji Heun Lee, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/041,466

(22) Filed: Sep. 30, 2013

(51) Int. Cl.
*H05K 5/00* (2006.01)
*H05K 7/00* (2006.01)
*G06F 1/16* (2006.01)

(52) U.S. Cl.
USPC ............. 361/679.09; 361/679.08; 361/679.17

(58) Field of Classification Search
CPC .... G06F 1/1662; G06F 1/1669; G06F 3/0202
USPC .............. 361/679.09, 679.17, 679.08, 679.55
See application file for complete search history.

(56) References Cited

U.S. PATENT DOCUMENTS

| | | | | |
|---|---|---|---|---|
| 5,483,418 | A * | 1/1996 | Hosoi | 361/679.55 |
| 6,104,604 | A * | 8/2000 | Anderson et al. | 361/679.55 |
| 6,459,591 | B2 | 10/2002 | Liu | |
| 7,778,016 | B2 * | 8/2010 | Minaguchi et al. | 361/679.17 |
| 7,869,205 | B2 | 1/2011 | Chin | |
| 7,990,693 | B2 * | 8/2011 | Nakajima | 361/679.09 |
| 8,027,156 | B2 * | 9/2011 | Kobayashi et al. | 361/679.17 |
| 8,089,758 | B2 | 1/2012 | Zhu et al. | |
| 8,339,775 | B2 | 12/2012 | Degner et al. | |
| 8,374,378 | B2 | 2/2013 | Hopkinson et al. | |
| 8,437,125 | B2 | 5/2013 | Jorgensen et al. | |
| 8,467,195 | B2 * | 6/2013 | Zaitsu | 361/800 |
| 8,537,530 | B2 * | 9/2013 | Murakami et al. | 361/679.17 |
| 8,564,841 | B2 * | 10/2013 | Gil | 358/3.26 |
| 2003/0011986 | A1 * | 1/2003 | Ariga | 361/687 |
| 2004/0000048 | A1 * | 1/2004 | Wu | 29/622 |
| 2009/0279238 | A1 * | 11/2009 | Kobayashi et al. | 361/679.09 |
| 2014/0043744 | A1 | 2/2014 | Matsuoka et al. | |

OTHER PUBLICATIONS

Non-Final Office Action for U.S. Appl. No. 14/041,629, mailed Feb. 28, 2014, 21 pages.

* cited by examiner

*Primary Examiner* — Anthony Haughton
(74) *Attorney, Agent, or Firm* — Brake Hughes Bellermann LLP

(57) ABSTRACT

A computing device may include a base assembly defining an opening, and a keyboard assembly including a plurality of keys. The keyboard assembly may be disposed within the opening of the base assembly. The computing device may include a keyboard support member having a lattice structure defining a plurality of openings. The keyboard support member may be configured to secure the keyboard assembly to the base assembly within the opening defined by the base assembly such that the plurality of keys fit within the plurality of openings defined by the lattice structure.

20 Claims, 6 Drawing Sheets

KEYBOARD SUPPORT MEMBER FOR A COMPUTING DEVICE

BACKGROUND

Housings for portable notebook or clamshell-style computers are often made from a number of plastic panels or sections that are assembled onto a base frame. The base frame may be structured to retain and attach together the computer's internal components. Such internal components can include a printed circuit board that carries the computer's central processor and any additional processors such as for graphics or the like as well as the computer's random-access memory (RAM). Additional components may include batteries, input devices such as a keyboard and trackpad or the like, storage memory (such as a hard drive, solid-state drive, or the like, communications devices (such as for WiFi connection and networking), removable memory devices (such as CD- or DVD-R/W drives), and structures for external peripheral connections.

In such frame-based housing structures, all components can be affixed to the base frame, which itself can be made up of several different parts. The components of the housing are in turn attached to the frame to provide a somewhat uniform external appearance and to provide protection for the internal components. In a notebook (or clamshell) configuration, the arrangement just described can make up a base unit that is configured to rest on a surface. Another assembly in the form of a display portion, or display, housing can be attached to the base housing by a hinge. The display portion can include a video display, which can be in the form of a LCD panel with various forms of backlighting associated therewith. Similar to the base housing, the display (and any other components also included within the lid housing) can be affixed to another frame to which other housing sections or panels are affixed to enclose the display portion. The hinge can be attached to both the frame of the display portion and the frame of the base with portions thereof extending through openings between or within the housing sections or panels.

The hinged attachment between the base and the display portion can allow the computer to be moved between open and closed configurations. The closed configuration being such that the display portion is positioned against the base with the display and input devices positioned internally of the housing units for protection thereof during transportation. In the open configuration, the display is viewable and the input devices are accessible to the user. The display portion can be rotated through a range of positions to provide for comfortable viewing of the display.

Such housing configurations can be complicated to assemble and to disassemble for repair or maintenance reasons due to the complicated nature of attaching multiple housing components to the frame. Further, they can be bulky due to the number of components and the complex assembly patterns required. Further, the number of joints or connections between components can provide a number of potential failure areas that can reduce the overall strength and protection provided by such housings. Additionally, because of the various ways in which the multiple panels are assembled together, repair or replacement of one component, such as the keyboard for example, can require removal of a number of components, some of which may also be attached to the display portion, requiring removal thereof or removal of other additional components or sub-assemblies. These configurations can also be visually unappealing, due to the number of separate components used and due to the gaps there between, which can expose fasteners, tabs or the like. This can be particularly noticeable, for example, around the keyboards used in such computer assemblies.

SUMMARY

The details of one or more implementations are set forth in the accompanying drawings and the description below. Other features will be apparent from the description and drawings, and from the claims.

A computing device may include a base assembly defining an opening, and a keyboard assembly including a plurality of keys. The keyboard assembly may be disposed within the opening of the base assembly. The computing device may include a keyboard support member having a lattice structure defining a plurality of openings. The keyboard support member may be configured to secure the keyboard assembly to the base assembly within the opening defined by the base assembly such that the plurality of keys fit within the plurality of openings defined by the lattice structure.

The base assembly may include a first housing and a second housing. The first housing may define a surface and a recess formed along a wall of the first housing. The recess from the surface may define the opening of the base assembly. The second housing may enclose at least one internal component of the computing device.

The keyboard support member may include an outer circumference portion defining a support member bezel, and the support member bezel may be configured to engage the wall of the base assembly and the keyboard assembly. The lattice structure may include a flexible material.

The keyboard support member may be coupled to the base assembly with the keyboard assembly located between the keyboard support member and the base assembly. The keyboard support member may be coupled to the base assembly based on thermoplastic staking. The keyboard support member may be coupled to the base assembly based on an interference fit. The keyboard support member may be coupled to the base assembly using a plurality of fasteners. The plurality of fasteners may include threaded fasteners. The keyboard support member may include a plurality of receiving units configured to receive a portion of the threaded fasteners.

In another embodiment, the computing device may include a base assembly defining an opening, and a keyboard assembly including a plurality of keys. The keyboard assembly may be located within the opening defined by the base assembly. The computing device may include a keyboard support member having a lattice structure defining a plurality of openings to receive the plurality of keys. The keyboard support member may be coupled to the base assembly with the keyboard assembly located between the keyboard support member and the base assembly.

The base assembly may include a first housing and a second housing. The first housing may include a surface and a recess formed along a wall of the first housing. The recess from the surface may define the opening of the base assembly. The second housing may include at least one internal component of the computing device.

The keyboard support member may include an outer circumference portion defining a support member bezel, and the support member bezel may be configured to engage the wall of the base assembly and the keyboard assembly. The keyboard support member may be coupled to the base assembly based on thermoplastic staking. The keyboard support member may be coupled to the base assembly based on an interference fit. The keyboard support member may be coupled to the base assembly using a plurality of fasteners. The plurality of fasteners may include threaded fasteners.

A laptop computing device may include a base assembly defining an opening, a keyboard assembly including a plurality of keys, where the keyboard assembly is located within the opening defined by the base assembly. The laptop computing device may also include a keyboard support member having a lattice structure defining a plurality of openings configured to receive the plurality of keys. The keyboard support member may be coupled to the base assembly using threaded fasteners with the keyboard assembly located between the keyboard support member and the base assembly.

The keyboard support member may include an outer circumference portion defining a support member bezel, and the support member bezel may include a surface exposed to the opening defined by the base assembly. The keyboard support member may include a plurality of receiving units configured to receive a portion of the threaded fasteners via the surface of the support member bezel. The support member bezel may be configured to engage a wall of the base assembly and the keyboard assembly.

DETAILED DESCRIPTION

As described herein, a keyboard support member may be coupled to a base assembly of a computing device, thereby securing a keyboard assembly to the base assembly. For example, the base assembly may define an opening within the base assembly, and the keyboard assembly may be placed within the opening of the base assembly. As further described with reference to the figures, the structure of the base assembly may permit the keyboard assembly to be inserted from the top from the perspective of a user looking down on the computing device.

The keyboard support member may include an outer circumference portion defining a support member bezel, and an interior portion having a lattice structure defining a plurality of opening that are configured to fit around the keys of the keyboard assembly. The keyboard support member may be coupled to the base assembly by heat staking, interference fit, or fasteners (e.g., threaded fasteners), thereby securely enclosing the keyboard assembly to the base assembly. In other words, the keyboard support member may be coupled to the base assembly with the keyboard assembly located between the keyboard support member and the base assembly. This structure permits easy removal of the keyboard assembly, as well as the interchangeability of various kinds of keyboard support members, which may have different materials (e.g., plastic, wood, metal, etc.) or colors around the support member bezel and/or lattice structure.

In one embodiment, the keyboard support member may be coupled to the base assembly using screw bosses. For example, screw bosses (e.g., plastic bosses) may be located on the keyboard support member, and threaded fasteners (e.g., screws) can be directed threaded into the keyboard support member. The screw bosses may extend from the keyboard support member bezel area and/or the lattice structure area. Further, the keyboard support member may include threaded metal inserts that can be molded or inserted into the material of the keyboard support member. Then, the screws can be fastened directly into the threaded metal inserts (e.g., brass threaded inserts molded into plastic bosses).

Further, the keyboard support member may be produced using a double shot method of molding the keyboard support member. For example, in a first shot, the keyboard support member may be molded into its lattice structure, and then in a subsequent shot, the support member bezel of the keyboard support member may be further molded to define its shape. In one embodiment, the support member bezel may include a different color than the interior lattices.

Figure 1:
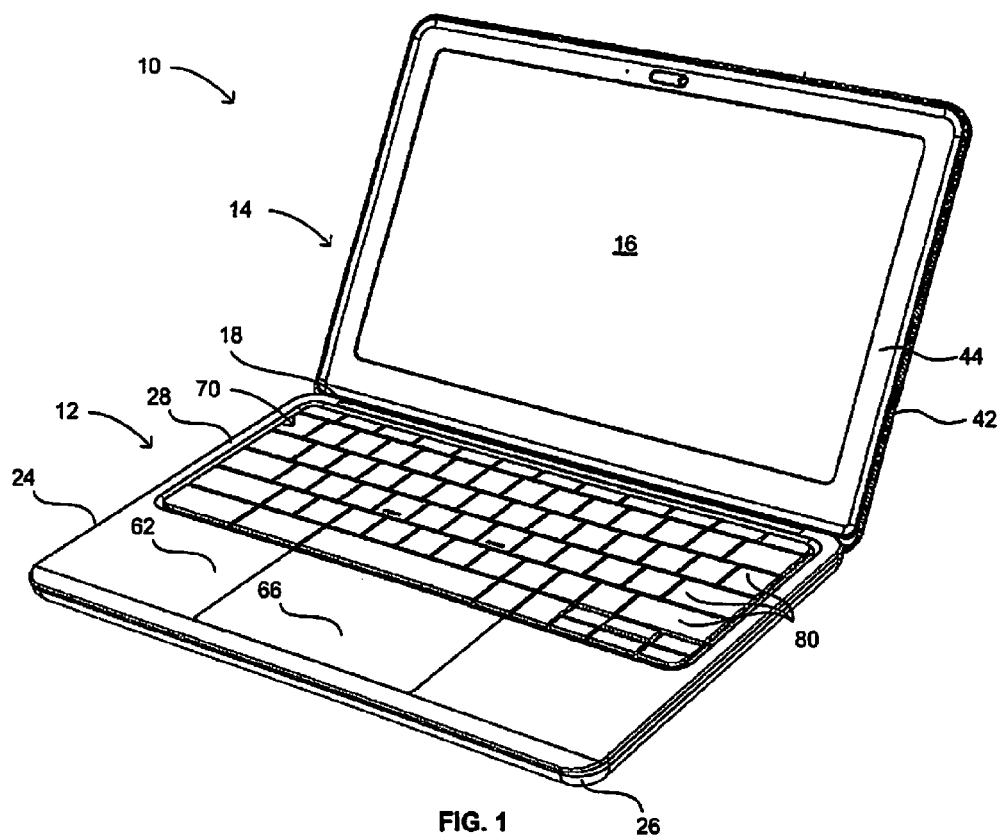
FIG. 1 illustrates a computing device having an open configuration according to an embodiment.
Figure 2:
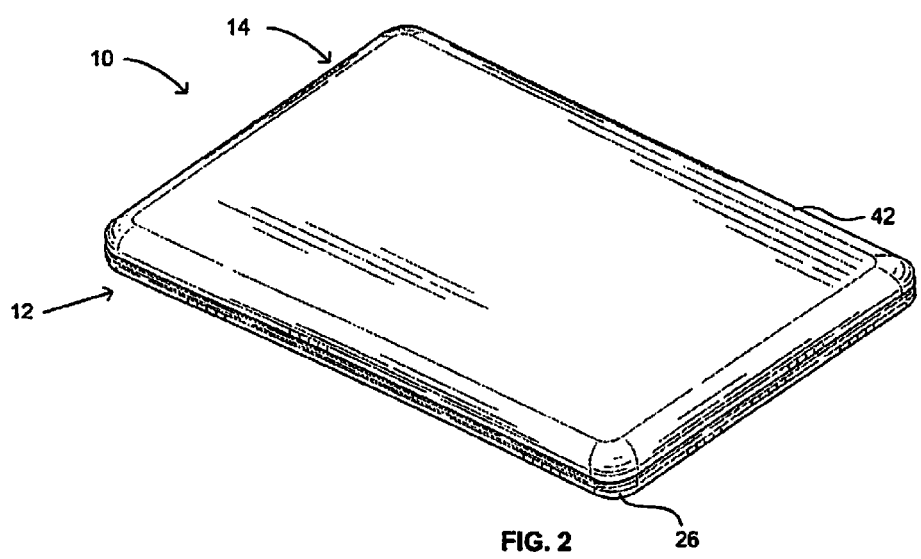
FIG. 2 illustrates the computing device having a closed configuration according to an embodiment.

FIGS. 1 and 2 illustrate a computing device 10 in the form of a notebook, laptop, or clamshell computer with a base assembly 12 configured to rest on a surface and to support a display portion 14 having a display screen 16. The display portion 14 may be connected to the base assembly 12 by a hinge 18 that allows the display portion 14 to close against the base assembly 12, as shown in FIG. 2, and to be opened by rotation away therefrom into a user-selectable viewing position, as shown in FIG. 1.

For example, the hinge 18 may connect the base assembly 12 with the display portion 14. The hinge 18 may be configured to allow the display portion 14 to rotate with respect to the base assembly 12 to provide the desired range of rotation to allow the display portion 14 to be positioned in the closed position or a range of open positions. The hinge 18 may also be configured to provide internal friction to maintain a selected open position of the display portion 14 relative to the base assembly 12.

The base assembly 12 may be configured to receive and retain a keyboard assembly 70 and a trackpad assembly 66 for receiving user input to the computing device 10. The keyboard assembly 70 may include a plurality of keys 80, as well as other keyboard components. The keyboard assembly 70 is further explained with reference to FIG. 3. The plurality of keys 80 may include any number of keys 80 that can be arranged according to any known keyboard configurations such as the Dvorak Simplified Keyboard, or QWERTY, for example.

The trackpad assembly 66 may also be referred to as a touchpad and may include any type of touch-sensitive input, operating by capacitive, magnetic, resistive, surface-acoustic wave or other forms of touch-sensitivity. Both the keyboard assembly 70 and the trackpad assembly 66 are mounted to the base assembly 12 such that the keyboard assembly 70 and the trackpad assembly 66 are exposed at (or otherwise available for user interaction on) an upper portion of the base assembly 12. For example, the keyboard assembly 70 and the trackpad assembly 66 may be exposed to the user by an opening defined by an upper surface 28 of the base assembly 12. It is noted that the terms upper, lower, and other terms related to relative positions of components or elements as depicted in the figures. Such terms are used for convenience and do not limit the actual positions of the elements or components should the device be repositioned.

The base assembly 12 may include a first housing 24 having a unitary material structure, and a second housing 26 that is assembled with the first housing 24 of the base assembly 12 to enclose some of the internal components of the computing device 10. The internal components may include a printed circuit board that carries the computer's central processor and any additional processors such as for graphics or the like as well as the computer's random-access memory (RAM). As shown in FIG. 1, the first housing 24 may be an upper housing located on an upper portion of the base assembly 12, and the second housing 26 may be a lower housing located on a lower portion of the base assembly 12. The first housing 24 may define an upper surface 28. For example, the upper surface 28 of the base assembly 12 may define an area 62 adjacent to the keyboard assembly 70 and the trackpad assembly 66. As further illustrated in FIG. 3, a portion of the upper surface 28 may define an opening configured to receive the keyboard assembly 70.

As with the first housing 24, the second housing 26 may have a unitary material structure. In some examples, the second housing 26 may include additional outer components, such as covers for externally-accessible batteries. In one example, the first housing 24 may be made from a single piece of plastic or metal, or multiple pieces of plastic or metal. Also, the second housing 26 can be made from a single piece of plastic or metal, or multiple pieces of plastic or metal. The plastic materials may include any type of plastic or semi-plastic materials. The metal materials may include any type of metal or semi-metal material such as aluminum, aluminum alloy, magnesium alloys, stainless steel, for example. The first housing 24 and the second housing 26 can be made by injection molding metal or plastic, and/or by die-casting metal.

In one embodiment, the second housing 26 may be configured to enclose the internal components of the base assembly 12 when assembled with the first housing 24. The second housing 26 can also be configured to allow the computing device 10 to rest on a surface. As such, the second housing 26 can include a generally flat lower surface with a plurality of feet or grip members that allow the base assembly 12 to rest on the surface and to be resistant to sliding during normal use. The second housing 26 can be configured to attach with the first housing 24 using screws or other fasteners to enclose the internal components such as one or more batteries, CPU board assembly and related circuitry, and communications structures, connection components such as USB plugs, or power plugs, as well as internal portions of the trackpad assembly 66 and the keyboard assembly 70. The first housing 24 and the second housing 26 can be configured such that the internal components can attach with either the first housing 24 or the second housing 26 prior to attachment of the two housings together.

The display portion 14 may include an outer housing 42, and a display bezel 44 that is attached to the outer housing 42 of the display portion 14. Together, the outer housing 42 of the display portion 14 and the display bezel 44 may enclose additional components of the display portion 14 such as the display screen 16 as well as any type of internal components such as internal display drivers, for example.

The display bezel 44 may be configured to surround at least part of the display screen 16. Further, the display bezel 44 may assist in retaining the internal components that are configured to be positioned within the display portion 14. For example, the display bezel 44 may define a display opening through which at least the display screen 16 is viewable by a user. The distance by which the display bezel 44 extends inward can vary depending on the configuration of, for example, the display portion 14 and/or the materials from which the display portion 14 is constructed. The outer housing 42 of the display portion 14 and the display bezel 44 can be assembled together using glue, pressure-sensitive adhesive, or mechanical fasteners such as screws, or snap-fit elements, for example. In another example, the outer housing 42 of the display portion 14, as well as the first housing 24 and the second housing 26 of the base assembly 12 can be integrally formed with the bezel 44 as a unitary housing configured with multiple, solidly joined, walls of a single piece of material.

Figure 3:
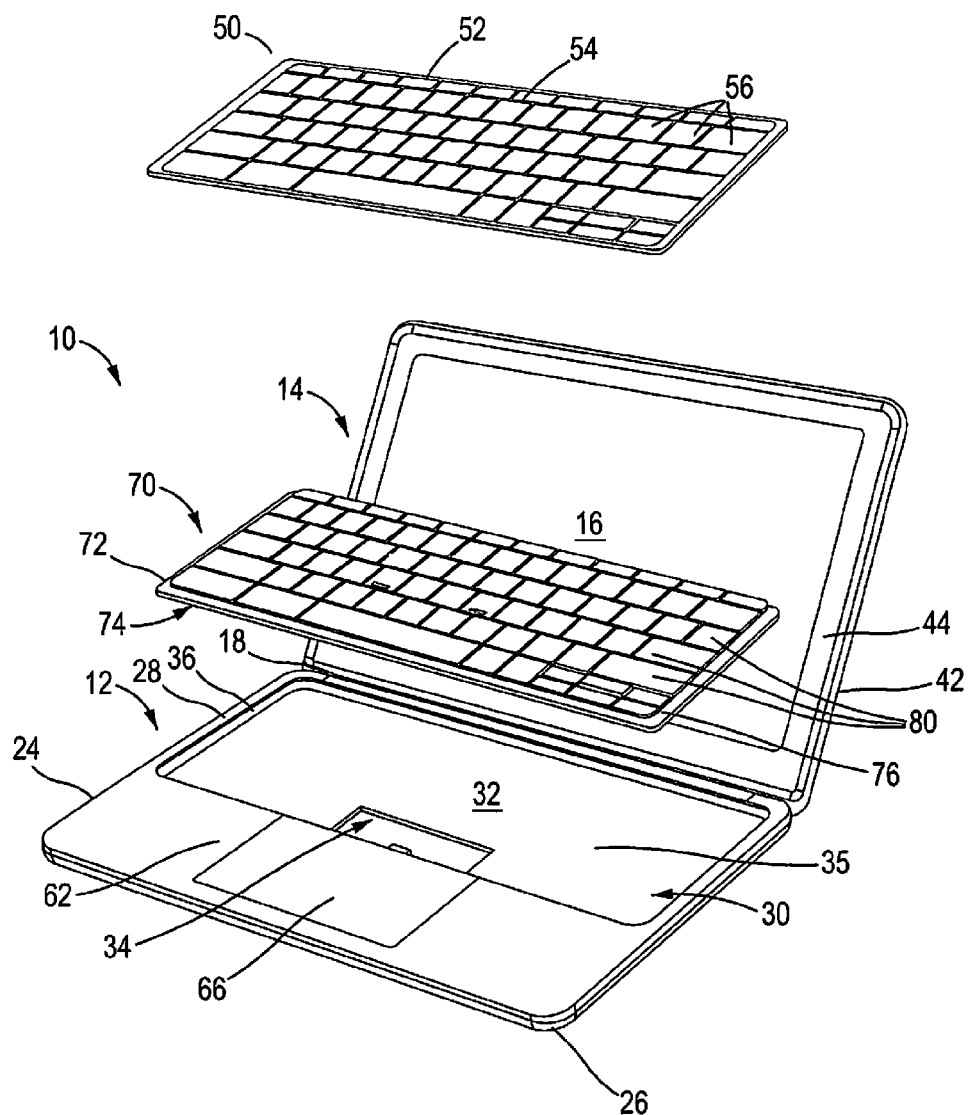
FIG. 3 illustrates an exploded view of the computing device with a keyboard support member configured to retain a keyboard assembly according to an embodiment.

FIG. 3 illustrates an exploded view of the computing device 10 with a keyboard support member 50 configured to retain the keyboard assembly 70 according to an embodiment.

As shown in FIG. 3, the computing device 10 may include the keyboard support member 50 configured to secure the keyboard assembly 70 to the base assembly 12. The keyboard support member 50 may include an outer circumference portion defining a support member bezel 52, and a lattice structure 54 defining a plurality of openings 56. The keyboard support member 50 may be configured to secure the keyboard assembly 70 to the base assembly 12 within a recess 32 defined by the first housing 24 of the base assembly 12 such that the plurality of keys 80 fit within the plurality of opening 56 defined by the lattice structure 54. For example, the lattice structure 54 of the keyboard support member 50 may be configured to fit around the keys 80 of the keyboard assembly 70 through the openings 56 of the keyboard support member 50. Accordingly, an arrangement of the lattice structure (e.g., the size of the openings 56) may be dependent upon the type of keyboard configuration such that the opening 56 may be configured to receive the keys 80. Once the keyboard support member 50 is secured to the base assembly 12 (with the keyboard assembly 70 located between the keyboard support member 50 and the base assembly 12), the inclusion of the keyboard support member 50 should not interfere with the operation of the keys 80.

In one embodiment, the numbers of openings 56 of the keyboard support member 50 correspond to the number of keys 80 of the keyboard assembly 70. In other embodiment, the number of openings 56 of the keyboard support member 50 is less than the number of keys 80 on the keyboard assembly 70. For example, an opening 56 may encompass one, two, three, or more keys 80. As such, although the lattice structure 54 may depend on the keyboard configuration, the number and size of the opening 56 defined by the lattice structure may widely vary.

The computing device 10 may be configured such that keyboard assembly 70 can be externally assembled with the base assembly 12 independently of the assembly of the internal computer components or the assembly of the first housing 24 with the second housing 26. As shown in FIG. 3, the computing device 10 can be configured such that substantially all of the components of the computing device 10 (excluding the keyboard assembly 70) can be assembled together before assembling the keyboard assembly 70 with the base assembly 12. In this example, this assembly is facilitated by the structure of the computing device 10, including the incorporation of a keyboard opening 30 positioned within the upper surface 28 of the first housing 24.

The keyboard opening 30 may be defined by the recess 32, which is defined by the first housing 24 that includes a lower surface 35 that is generally parallel to and positioned below the upper surface 28. A wall 36 may extend between the upper surface 28 and the lower surface 35 and may define an outer periphery of the recess 32 that extends from the periphery defined by the keyboard opening 30. The recess 32 may be formed along the wall 36 of the first housing 24 with a depth extending from the upper surface 28 to the lower surface 35. As such, the recess 32 from the upper surface 28 defines the keyboard opening 30. In one embodiment, the support member bezel 52 may be configured to engage the wall 36 of the base assembly 12 and the keyboard assembly 70.

Generally, a size of the keyboard opening 30 is based on the structure of the keyboard assembly 70 (as well as the size of the support member bezel 52) such that the keyboard assembly 70 can be assembled therein with the keyboard support member 50 being placed over the keyboard assembly 70 in a manner that allows the keyboard support member 50 to be secured to the first housing 24. Also, the upper surface 28 of the base assembly 12 may define the area 62 adjacent to the keyboard assembly 70 and the trackpad assembly 66. A number of peripheral connection openings (not shown) to the interior of the base assembly 12 may also be included in the first housing 24 and/or the second housing 26, and may allow for access to peripheral connections such as a power adapter plug, a USB device, one or more memory cards, audio devices, for example.

The keyboard assembly 70 may include a body in the form of a substrate 72 that defines substantially parallel and spaced-apart upper 76 and lower 74 surfaces. The substrate 72 further has affixed thereto, over the upper surface 76, the plurality of keys 80 configured to provide various inputs to the computing device 10 common of computer keyboards in general. As shown, the substrate 72 may define its own outer periphery that extends beyond the outermost ones of the keys 80 supported by substrate 72.

The wall 36 of the recess 32 and the periphery of the substrate 72 can be configured such that the substrate 72 can be received within the recess 32 with the lower surface 74 of the substrate 72 resting on the lower surface 35 of recess 32. The particular fit between the substrate 72 and the recess 32 can vary, but in the present example can be such that keyboard assembly 70 can be moved into the recess 32 without significant resistance but such that lateral movement of keyboard assembly 70 within the recess 32 is limited.

The relative sizes of the substrate 72 and the recess 32 can be adjusted to account for tolerances in the various manufacturing processes used in formation thereof. Other configurations of the substrate 72 and the recess 32 are possible, including those in which a press or resistance fit is achieved between the substrate 72 and the recess 32 or those in which a certain degree of lateral movement of the keyboard assembly 70 within the recess 32 is permitted with other features, such as adhesives or other fasteners used to maintain the lateral position of keyboard assembly 70 within the recess 32. Further, the depth of the recess 32 relative to the overall height of the keyboard assembly 70 can be such that plurality of keys 80 are substantially even with the upper surface 28 of the first housing 24 or project slightly above the upper surface 28.

Further, the recess 32 may include an access opening 34 within the recess 32 to allow the keyboard assembly 70 to be connected with the internal components of the base assembly 12, such as the printed circuit board, for example. Although such features are omitted from the figures for clarity, the general structure of such features can be similar to those used in other portable computer applications. In an example, a connection cable (not shown) can extend from keyboard assembly 70 and can be extended through the access opening 34 to connect with a corresponding connection internal to the base assembly 12. In another example, a cable can extend from an internal component within the base assembly 12 that is configured to receive inputs from keyboard assembly 70 and can pass through the access opening 34 to be connected with the keyboard assembly 70 prior to the keyboard assembly 70 being placed within the recess 32.

Other configurations of portions of the first housing 24 within the keyboard opening 30 are possible. In one example, the first housing 24 of the base assembly 12 may be substantially open to the interior of the base assembly 12 within the keyboard opening 30 with a plurality of appropriately-positioned tabs or other support structures extending inward relative to the keyboard opening 30 to retain the keyboard assembly 70 in an appropriate position relative to the keyboard opening 30 and the upper surface 28 of the base assembly 12. In another example, the recess 32 can include a plurality of openings similar to the access opening 34 to provide additional pass-throughs for connection between the keyboard assembly 70 and the internal components of the base assembly 12 or to allow for cooling, weight reduction, or transmission of sound from internal speakers. In such a configuration, the plurality of openings can be sized and positioned such that a web-like support structure that is substantially open to the interior of the base assembly 12 defining the recess 32.

In a further embodiment, the recess 32 may be defined such that different types of keyboards may be placed within the recess 32 and then coupled to the base assembly via the keyboard support member 50. For example, the structure of the recess 32 may permit the interchangeability of various kinds of keyboards. In addition, the keyboard support member 50 may be configured such that it can secure various types of keyboards. In this respect, the lattice structure 54 may be generic enough to fit around the keys 80 of various types of keyboards.

Figure 4:
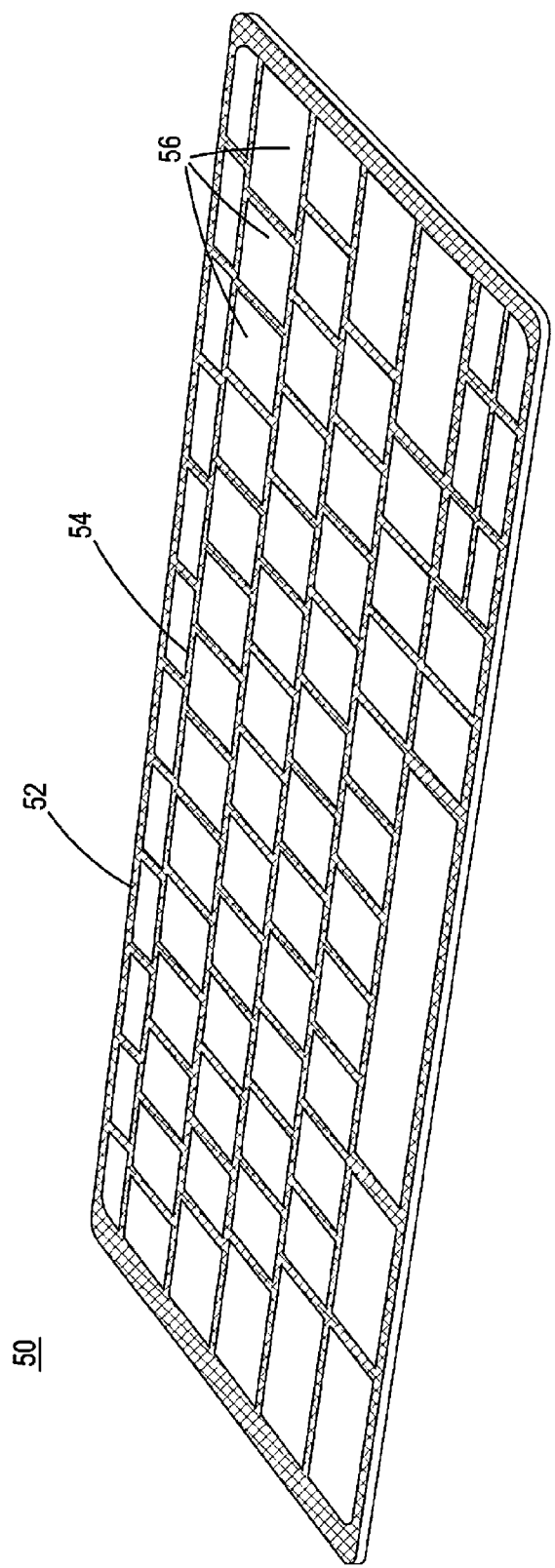
FIG. 4 illustrates a larger view of the keyboard support member according to an embodiment.

FIG. 4 illustrates a larger view of the keyboard support member 50 according to an embodiment. As shown in FIG. 4, the keyboard support member 50 may include the support member bezel 52 and the lattice structure 54 defining the plurality of openings 56. In one example, the keyboard support member 50 may be a continuous frame-like structure defining the support member bezel 52 and the lattice structure 54.

FIG. 4 illustrates one-side of the keyboard support member 50, e.g., the surface that is exposed to the user. The opposite-side of the keyboard support member 50 (not shown) includes a surface exposed to the keyboard assembly 70 and the base assembly 12, which may include receiving units (e.g., screw bosses) on the support member bezel 52 for receiving fasteners, as further depicted in FIG. 5. Alternatively, the surface of the keyboard support member 50 exposed to the user (e.g., as shown in FIG. 4) may include a plurality of openings configured to receive the fasteners, which then are secured to the base assembly 12. In this configuration, the base assembly 12 may include the receiving units configured to receive a portion of the fasteners exposed through the keyboard support member 50. As such, the fasteners may be inserted from the surface exposed to the user to the base assembly 12. Also, it is noted that if the keyboard support member 50 is coupled to the base assembly 12 by heat staking or interference fit, the keyboard support member 50 does not include the receiving units.

The lattice structure 54 may include strips of material that connects to each other that form an interlaced structure or pattern. In particular, the lattice structure 54 may include a plurality of first elongated members (having a certain thickness) that extend from one end of the keys 80 to the other end of keys 80, and a series of smaller second elongated members (having a certain thickness) that extend from each of the first elongated members and possibly connect to another first elongated member. In one example, the first elongated members may be horizontal and substantially parallel to each other, and the second elongated members may be vertical. Also, the first elongated members may have the same or different thickness as the second elongated members. The first and second elongated members may be integrally formed such that their arrangement in the lattice structure 54 appears as one continuous material.

Also, the material of the support member bezel 52 may have a different thickness than the material of the lattice structure 54. In one embodiment, the support member bezel 52 may have a greater thickness than the material of the lattice structure 54. In one example, the support member bezel 52 may include a first layer of material disposed on a second layer of material, whereas the lattice structure 54 may include the first layer of material. These features are further explained with reference to FIG. 7.

According to another embodiment, the keyboard support member 50 may include the lattice structure 54 defining the opening 56, but not the support member bezel 52. For example, the lattice structure 54 may include portions that fit around at least some of the keys. However, the keyboard support member 50 may not include an outer circumference portion that is disposed on the outside of the outermost keys 80. In this example, the lattice structure 54 (e.g., the series of first and second elongated members) may extend to the edge of the keyboard opening 30 (or the first housing 24), and the interference between the lattice structure 54 and the base assembly 12 may secure the keyboard assembly 70 into position.

Referring back to FIG. 3, the keyboard support member 50 may be configured such that an outer circumference of the support member bezel 52 fits securely within the wall 36 and/or the keyboard opening 30 and further such that a portion thereof extends past the outer periphery of substrate 72 and contacts a portion of the upper surface 76 of the substrate 72. Accordingly, the keyboard support member 50 can be assembled with the base assembly 12 after the keyboard assembly 70 has been positioned within the recess 32 to secure the keyboard assembly 70 to the base assembly 12.

The keyboard support member 50 may be a flexible or semi-flexible material. In one example, the keyboard support member 50 made of a polymeric material such as a plastic, for example. Other materials can also be used for the keyboard support member 50 such as various rubbers or metals, for example. The keyboard support member 50 may be flexible or compressible so that it can make an appropriately tight fit within the keyboard opening 30 and so that it can exert a force against the substrate 72 to maintain contact between the lower surface 74 of the substrate 72 and the lower surface 35 of recess 32.

Figure 5:
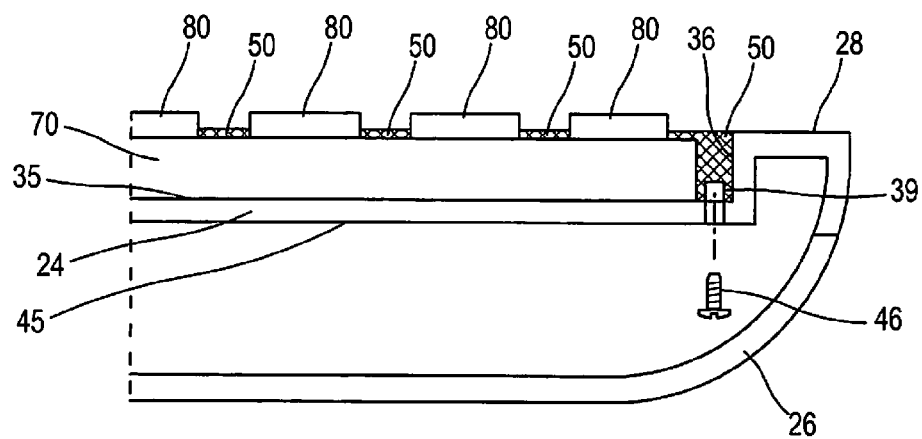
FIG. 5 illustrates a cross-sectional view of the computing device according to an embodiment.

FIG. 5 illustrates a cross-sectional view of the computing device 10 according to an embodiment. As shown in FIG. 5, the keyboard support member 50 is coupled to the base assembly 12 with the keyboard assembly 70 located between the keyboard support member 50 and the base assembly 12. For example, the keyboard support member 50 may be configured to secure the keyboard assembly 70 to the base assembly 12 within the keyboard opening 30 defined by the base assembly 12 such that the plurality of keys 80 are within the openings 56 defined by the lattice structure 54.

In particular, the keyboard assembly 70 is disposed within the recess 32 defined by the wall 36 to contact the lower surface 35. Then, the keyboard support member 50 is placed on top of the keyboard assembly 70 such that the plurality of openings 56 defined by the lattice structure 54 fit around the keys 80. At least a portion of the keyboard support member 50 (e.g., a portion of the support member bezel 52) may contact the lower surface 35 of the recess 32.

In one embodiment, the keyboard support member 50 may be coupled to the base assembly 12 (e.g., the first housing 24) using a plurality of fasteners 46. The fasteners 46 may include threaded fasteners such as screws, or generally any type of fastener that capable of connecting two components together. In one example, the support member bezel 52 of the keyboard support member 50 may be coupled to the first housing 24 of the base assembly 12. As further explained below, the fasteners 46 may be positioned or threaded through the first housing 24 and through a portion of the keyboard support member 50.

Although one fastener 46 is illustrated in FIG. 5, the keyboard support member 50 may be secured to the base assembly 12 using any number of fasteners 46. For example, the fasteners 46 may secure the keyboard support member 50 to the base assembly 12 at locations around the first housing 24 that correspond to the support member bezel 52. Referring to the first housing 24 (which includes the lower surface 35 and a surface 45 exposed to the second housing 26), the fastener 46 may be positioned or threaded through the first housing 24 (e.g., through the surface 45 to the lower surface 35) and engage the keyboard support member 50. The support member bezel 52 may be configured to receive at least a portion of the fastener 46.

In one example, if the coupling is based on fasteners 46, the keyboard support member 50 may include a plurality of receiving units, one of which is illustrated by receiving unit 39. For example, the receiving unit 39 may be configured to receive a portion of the fastener 46. In one example, the receiving unit 39 may be a channel or void in the support member bezel 52 that accepts or receives the fastener 46. In one example, the receiving unit 39 may be considered a screw boss. In this context, the channel or void of the receiving unit 39 may include a structure that may correspond to the structure of the corresponding fastener 46. In one example, if the fastener 46 is screw, the receiving unit 39 may include threads that are capable of receiving the screw as the screw rotates. According to one example, a plurality of receiving units may be positioned around the support member bezel 52. The receiving unit 39 may extend into only a portion of the keyboard support member 50 such that the surface of the keyboard support member 50 exposed to the user does not expose any portion of the receiving unit 39. Rather, the receiving unit 39 is exposed on the surface of the keyboard support member 50 facing the lower surface 35.

Also, the receiving units 39 may be screw bosses (e.g., plastic bosses) that are located on the keyboard support member 50, and threaded fasteners (e.g., screws) can be directed threaded into the keyboard support member 50. The screw bosses may extend from the keyboard support member bezel area and/or the lattice structure area. Further, the keyboard support member 50 may include threaded metal inserts that can be molded or inserted into the material of the keyboard support member 50. Then, the screws can be fastened directly into the threaded metal inserts (e.g., brass threaded inserts molded into plastic bosses).

In another embodiment, as indicated above, the keyboard support member 50 may include a plurality of openings positioned around the support member bezel 52, which are configured to initially receive the fasteners 46. For example, the fasteners 46 may be initially received by the surface of the keyboard support member 50 that is exposed to the user. Then, the fasteners 46 are configured to protrude from the keyboard support member 50 via the openings into the base assembly 12. In this configuration, the first housing 24 may include the plurality of receiving units including the receiving unit 39, which are configured to receive the portions of the fasteners 46 extending out of the keyboard support member 50.

In another embodiment, the keyboard support member 50 may be coupled to the base assembly 12 based on thermoplastic staking. For example, thermoplastic staking (also referred to as heat staking) is a process of connecting of two components using heat. In this example, portions of the keyboard support member 50 (e.g., portions of the support member bezel 52) and/or portions of the first housing 24 may be heated to connect the keyboard support member 50 to the base assembly 12.

In yet another embodiment, the keyboard support member 50 may be coupled to the base assembly 12 based on an interference fit. For example, the structure of the keyboard support member 50 may be dimensioned such that the keyboard support member 50 may fit around the keys 80, and in between the keyboard assembly 70 and the first housing 24. In particular, the support member bezel 52 may engage the keyboard assembly 70 and the wall 36 such that the keyboard support member 50 is securely fixed.

In particular, the keyboard support member 50 may be made of a resiliently-flexible material such as Nylon, plastic, or the like. The use of a flexible material can allow the keyboard support member 50 to be oversized with respect to the depth with which it extends into the recess 32 such that it flexes when pressed into contact with the upper surface 76 of the keyboard assembly 70 and the lower surface 35 of the recess. This can cause the keyboard support member 50 to exert a constant downward force onto the substrate 72 that can help to retain the position, both vertically, and laterally, of the keyboard assembly 70 within the recess 32. Other shapes and configurations of the keyboard support member 50 can be used and can be adjusted or otherwise devised to give varying cosmetic appearances, to provide varying fits or interactions with the recess 32 and the keyboard assembly 70 and to take advantage of various material properties.

Further, the keyboard support member 50 may be produced using a double shot method of molding. For example, in a first shot, the keyboard support member 50 may be molded into its lattice structure 54, and then in a subsequent shot, the support member bezel 52 of the keyboard support member 50 may be further molded to its structure. In one embodiment, the support member bezel 52 may include a different color than the lattice structure 54.

Figure 6B:
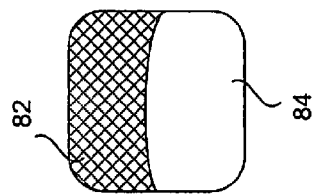
FIG. 6B illustrates a cross-section of the keyboard support member of FIG. 6A according to an embodiment.
Figure 6A:
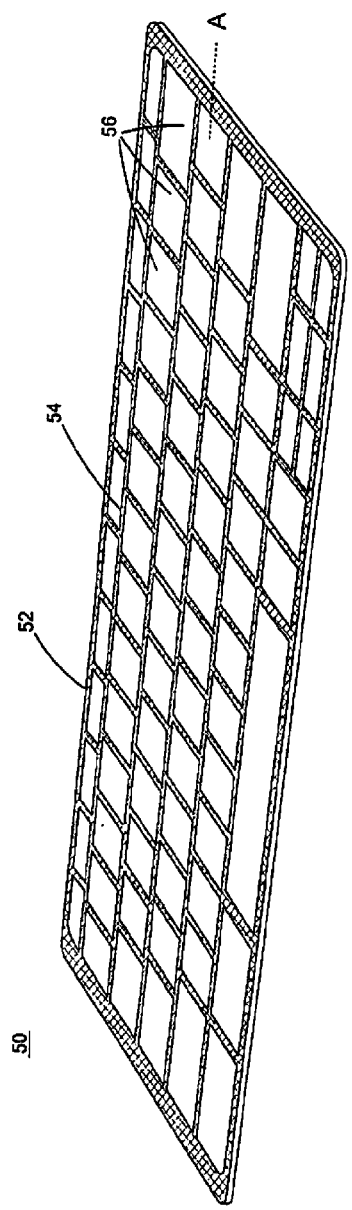
FIG. 6A illustrates the keyboard support member according to an embodiment.

FIG. 6A illustrates the keyboard support member 50 according to an embodiment. The keyboard support member 50 is the same as illustrated in FIGS. 3 and 4 except for the inclusion of the cross-section taken along line A.

FIG. 6B illustrates a cross-section of the keyboard support member 50 along the line A of FIG. 6A according to an embodiment. As discussed above, the keyboard support member 50 may produced using a double shot method of molding, where the keyboard support member 50 is initially formed by a first shot of molding, and then the support member bezel 52 is further defined by the second shot of molding. As a result, the support member bezel 52 may include two layers of materials (one from the first shot and another one from the second shot). As shown in FIG. 6B, the support member bezel 52 may include a first layer of material 82 from the first shot of molding. In one example, as shown in FIG. 6B, the entire keyboard support member 50 includes the first layer of material 82 (e.g., as shown by the crisscrossed lines). Also, the support member bezel 52 includes a second layer of material 84 from the second shot of molding, which may be injected below the first layer of material 82. The second layer of material 84 may further define the structure of support member bezel 52.

In one example, the interior lattice structure 54 may not include the second layer of material 84. As such, the lattice structure 54 may have a smaller depth than the support member bezel 52. Also, in one example, the first layer of material 82 may be different than the second layer of material 84. In another example, the first layer of material 82 may be the same as the second layer of material 84. In another example, the first layer of material 82 may be a different color than the second layer of material 84.

Figure 7:
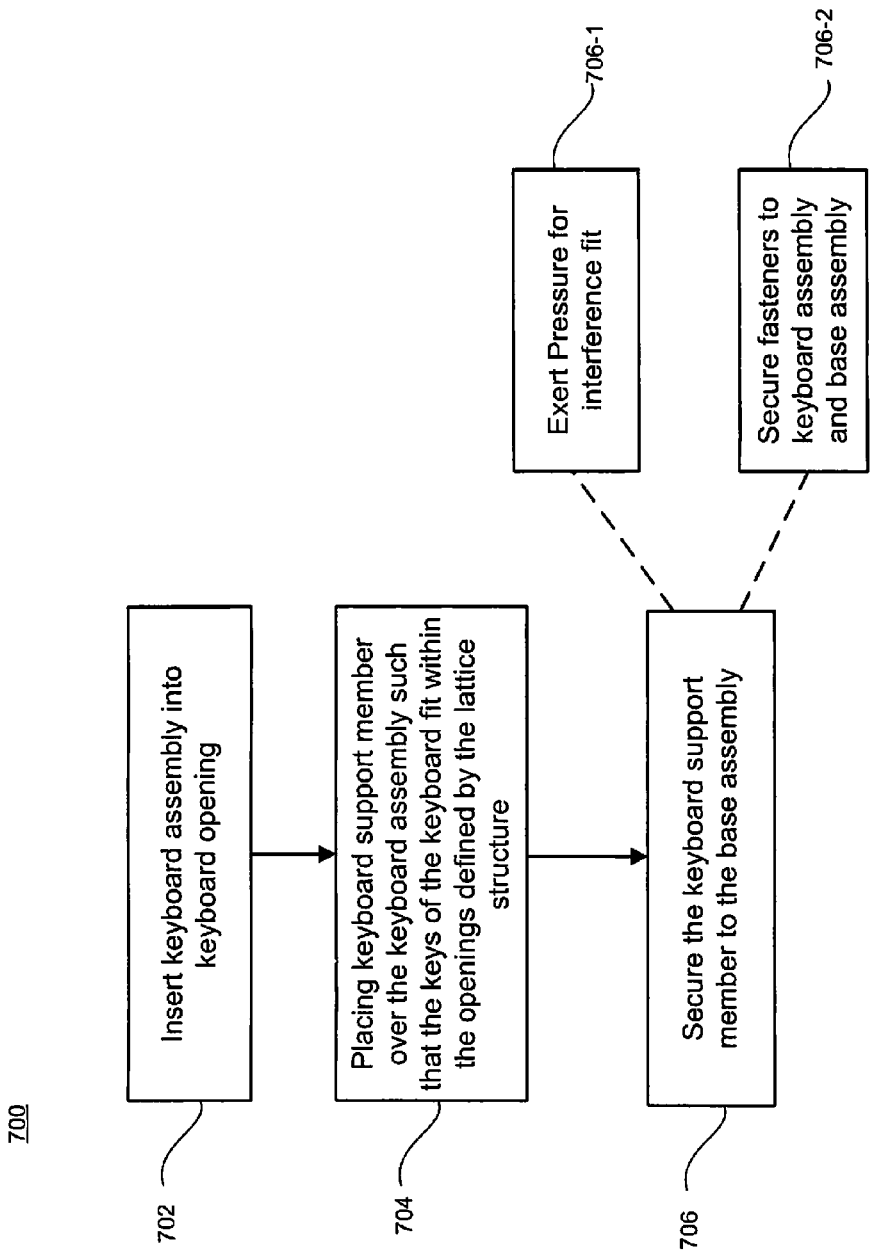
FIG. 7 illustrates a method of assembling the computing device according to an embodiment.

FIG. 7 illustrates a method of assembling the computing device 10. In 702, the keyboard assembly 70 may be inserted into the keyboard opening 30. For example, the computing device 10 may be configured such that keyboard assembly 70 can be externally assembled with the base assembly 12 independently of the assembly of the internal computer components or the assembly of the first housing 24 with the second housing 26. The computing device 10 can be configured such that substantially all of the components of the computing device 10 (excluding the keyboard assembly 70) can be assembled together before assembling the keyboard assembly 70 with the base assembly 12.

Then, the keyboard assembly 70 may be inserted into the keyboard opening 30. The keyboard opening 30 may be defined by the recess 32, which is defined by the first housing 24 that includes a lower surface 35 that is generally parallel to and positioned below the upper surface 28. A wall 36 may extend between the upper surface 28 and the lower surface 35 and may define an outer periphery of the recess 32 that extends from the periphery defined by the keyboard opening 30. The recess 32 may be formed along the wall 36 of the first housing 24 with a depth extending from the upper surface 28 to the lower surface 35. As such, the recess 32 from the upper surface 28 defines the keyboard opening 30.

Then, the wall 36 of the recess 32 and the periphery of the substrate 72 of the keyboard assembly 70 can be configured such that the substrate 72 can be received within the recess 32 with the lower surface 74 of the substrate 72 resting on the lower surface 35 of recess 32. The particular fit between the substrate 72 and the recess 32 can vary, but in the present example can be such that keyboard assembly 70 can be moved into the recess 32 without significant resistance but such that lateral movement of keyboard assembly 70 within the recess 32 is limited.

In 704, the keyboard support member 50 is placed over the keyboard assembly 70 such that the keys 80 of the keyboard assembly 70 fit within the openings 56 defined by the lattice structure 54. For example, the keyboard support member 50 is placed on top of the keyboard assembly 70 such that the plurality of openings 56 defined by the lattice structure 54 fit around the keys 80. At least a portion of the keyboard support member 50 (e.g., a portion of the support member bezel 52) may contact the lower surface 35 of the recess 32.

In 706, the keyboard support member 50 may be secured to the base assembly 12. For example, the keyboard support member 50 is coupled to the base assembly 12 with the keyboard assembly 70 located between the keyboard support member 50 and the base assembly 12. In one embodiment, the support member bezel 52 may be configured to engage the wall 36 of the base assembly 12 and the keyboard assembly 70. The keyboard support member 50 may be secured to the base assembly 12 according to a number of different configurations.

In one example, in 706-1, pressure may be applied to the keyboard support member 50 thereby creating an interference fit between the keyboard support member 50 and the base assembly 12. For example, the structure of the keyboard support member 50 may be dimensioned such that the keyboard support member 50 may fit around the keys 80, and in between the keyboard assembly 70 and the first housing 24. In particular, upon the application of downward pressure on the keyboard support member 50, the support member bezel 52 may engage the keyboard assembly 70 and the wall 36 such that the keyboard support member 50 is securely fixed.

In another example, in 706-2, the keyboard support member 50 may be coupled to the base assembly 12 (e.g., the first housing 24) using a plurality of fasteners 46. The fasteners 46 may include threaded fasteners such as screws, or generally any type of fastener that capable of connecting two components together. In one example, the support member bezel 52 of the keyboard support member 50 may be coupled to the first housing 24 of the base assembly 12. As further explained below, the fasteners 46 may be positioned or threaded through the first housing 24 and through a portion of the keyboard support member 50.

The fasteners 46 may secure the keyboard support member 50 to the base assembly 12 at locations around the first housing 24 that correspond to the support member bezel 52. The fasteners 46 may be positioned or threaded through the first housing 24 (e.g., through the surface 45 to the lower surface 35) and engage the keyboard support member 50. The support member bezel 52 may be configured to receive at least a portion of the fastener 46.

According to one example, the keyboard support member 50 may include the plurality of receiving units including the receiving unit 39. For example, the receiving unit 39 may be configured to receive a portion of the fastener 46. In one example, the receiving unit 39 may be a channel or void in the support member bezel 52 that accepts or receives the fastener 46. In one example, the receiving unit 39 may be considered a screw boss.

In another embodiment, as indicated above, the keyboard support member 50 may include openings positioned around the support member bezel 52, which are configured to initially receive the fasteners 46. For example, the fasteners 46 may be initially received by the surface of the keyboard support member 50 that is exposed to the user. Then, the fasteners 46 are configured to protrude from the keyboard support member 50 via the openings into the base assembly 12. In this configuration, the first housing 24 may include the plurality of receiving units, which are configured to receive the portions of the fasteners 46 extending out of the keyboard support member 50.

What is claimed is:

1. A computing device, comprising:
a base assembly defining an opening;
a keyboard assembly including a plurality of keys, the keyboard assembly being disposed within the opening of the base assembly; and
a keyboard support member having a lattice structure defining a plurality of openings and an outer perimeter portion defining a support member bezel, the support member bezel having a thickness greater than a thickness of the lattice structure, the keyboard support member being configured to secure the keyboard assembly to the base assembly within the opening defined by the base assembly such that the plurality of keys fit within the plurality of openings defined by the lattice structure.

2. The computing device of claim 1, wherein the base assembly includes a first housing and a second housing, the first housing defining a surface and a recess formed along a wall of the first housing, the recess from the surface defining the opening of the base assembly, the second housing enclosing at least one internal component of the computing device.

3. The computing device of claim 2, wherein the support member bezel is configured to engage the wall of the base assembly and the keyboard assembly.

4. The computing device of claim 1, wherein the base assembly includes a first material, the support keyboard support member including at least one second material, the at least one second material being different from the first material, the at least one second material including a flexible material.

5. The computing device of claim 1, wherein the keyboard support member is coupled to the base assembly with the keyboard assembly located between the keyboard support member and the base assembly.

6. The computing device of claim 1, wherein the keyboard support member is coupled to the base assembly based on thermoplastic staking.

7. The computing device of claim 1, wherein the keyboard support member is coupled to the base assembly based on an interference fit.

8. The computing device of claim 1, wherein the support member bezel of the keyboard support member defines at least one receiving unit, the at least one receiving unit being a cavity defining an opening on the surface of the support member bezel such that the cavity extends into the support member bezel, the cavity configured to receive a threaded fastener.

9. The computing device of claim 1-8, wherein the lattice structure is composed of a first layer of material, and the support member bezel is composed of the first layer of material and a second layer of material, the second layer of material being coupled to the first layer of material of the support member bezel, the lattice structure being devoid of the second layer of material.

10. The computing device of claim 9, wherein the second layer of material defines at least one receiving unit, the at least one receiving unit being a cavity defining an opening on the surface of the second layer of material such that the cavity extends into the second layer of material, the cavity configured to receive a threaded fastener.

11. A computing device, comprising:
a base assembly defining an opening;
a keyboard assembly including a plurality of keys, the keyboard assembly being located within the opening defined by the base assembly; and
a keyboard support member having a lattice structure defining a plurality of openings to receive the plurality of keys and an outer perimeter portion defining a support member bezel, wherein the keyboard support member is coupled to the base assembly with the keyboard assembly located between the keyboard support member and the base assembly,
the lattice structure being composed of a first layer of material, the support member bezel being composed of the first layer of material and a second layer of material, the second layer of material being coupled to the first layer of material of the support member bezel.

12. The computing device of claim 11, wherein the base assembly includes a first housing and a second housing, the first housing including a surface and a recess formed along a wall of the first housing, the recess from the surface defining the opening of the base assembly, the second housing including at least one internal component of the computing device.

13. The computing device of claim 11, wherein the first layer of material is a different material than the second layer of material.

14. The computing device of claim 11, wherein the lattice structure is devoid of the second layer of material.

15. The computing device of claim 11, wherein the keyboard support member is coupled to the base assembly based on an interference fit.

16. The computing device of claim 11, wherein the second layer of material defines at least one receiving unit, the at least one receiving unit being a cavity defining an opening on the surface of the second layer of material such that the cavity extends into the second layer of material, the cavity configured to receive a threaded fastener.

17. The computing device of claim 16, wherein the threaded fastener includes a first portion extending through at least a portion of the base assembly and a second portion disposed within the cavity defined by the second layer of material.

18. A laptop computing device, comprising:
a base assembly defining an opening;
a keyboard assembly including a plurality of keys, the keyboard assembly being located within the opening defined by the base assembly; and
a keyboard support member having a lattice structure defining a plurality of openings configured to receive the plurality of keys and an outer perimeter portion defining a support member bezel, wherein the support member bezel is coupled to the base assembly using a plurality of fasteners with the keyboard assembly located between the keyboard support member and the base assembly,
the support member bezel defining a plurality of receiving units disposed at different locations on the outer perimeter portion, the plurality of receiving unit including a receiving unit defining a cavity having an opening on a surface of the outer perimeter portion such that the cavity extends into the outer perimeter portion, the cavity configured to receive a fastener.

19. The laptop computing device of claim 18, wherein the lattice structure is composed of a first layer of material, and the support member bezel is composed of the first layer of material and a second layer of material, the second layer of material being coupled to the first layer of material of the support member bezel, the second layer of material defining the plurality of receiving units.

20. The laptop computing device of claim 19, wherein the fastener includes a first portion extending through at least a portion of the base assembly and a second portion disposed within the cavity defined by the second layer of material.

* * * * *

UNITED STATES PATENT AND TRADEMARK OFFICE
CERTIFICATE OF CORRECTION

PATENT NO. : 8,811,003 B1
APPLICATION NO. : 14/041466
DATED : August 19, 2014
INVENTOR(S) : Jeffrey Hayashida et al.

Page 1 of 1

It is certified that error appears in the above-identified patent and that said Letters Patent is hereby corrected as shown below:

In the claims,

In column 14, line 29, in claim 9, delete "1-8," and insert -- 1, --, therefor.

Signed and Sealed this
Eighteenth Day of November, 2014

Michelle K. Lee
*Deputy Director of the United States Patent and Trademark Office*